Dec. 1, 1970  C. S. WEAVER  3,544,197
OPTICAL CROSSCORRELATION

Filed March 23, 1967  2 Sheets-Sheet 1

INVENTOR
CHARLES S. WEAVER
BY Lindenberg & Freilich

ATTORNEYS

Dec. 1, 1970   C. S. WEAVER   3,544,197
OPTICAL CROSSCORRELATION
Filed March 23, 1967   2 Sheets-Sheet 2

INVENTOR
CHARLES S. WEAVER
BY Lindenberg & Freilich
ATTORNEYS

United States Patent Office 3,544,197
Patented Dec. 1, 1970

3,544,197
OPTICAL CROSSCORRELATION
Charles S. Weaver, Palo Alto, Calif., assignor to Research Corporation, New York, N.Y., a nonprofit corporation of New York
Filed Mar. 23, 1967, Ser. No. 625,460
Int. Cl. G02b 27/38
U.S. Cl. 350—162      9 Claims

ABSTRACT OF THE DISCLOSURE

This invention eliminates the requirement for extreme accuracy in positioning transparencies along the optical path of laser signal processors by placing the two transparencies in the same plane, on opposite sides of the axis of the laser beam, instead of at positions spaced from each other along the axis of the laser beam. In the invention, a collimated laser beam shines through the two transparencies containing the functions to be convoluted, or compared, the transparencies being positioned in the same plane but offset on opposite sides of the laser beam axis. The emerging beam passes through a lens and the Fraunhofer diffraction pattern falls on photographic film. Then a laser beam is projected through the developed film and a focusing lens, and the image is recorded on a second photographic film. The image on the second film is the convolution of the two functions on the transparencies.

BACKGROUND OF THE INVENTION

Field of the invention

This invention relates to optical signal processing and more particularly to an improved apparatus and method for convoluting functions available in optical form.

Description of the prior art

Many types of data are most readily available in optical form, such as on photographic film. The availability of lasers to produce intense coherent light has enabled the development of new optical methods for processing such data. These techniques are important in designing machines that can identify objects by comparing them to reference patterns, regardless of the position or orientation of the object, and in other applications.

One important method of optical processing involves the projection of a collimated laser beam through a first transparency containing a first function, through a converging lens, through a second transparency (usually the reference or function or filter) containing the Fourier transform of a second function, through a second lens, and then on to a photographic film for recording the final image. The final image is the convolution, or multiplication point-by-point, of the two functions. A serious limitation on the use of such methods is the fact that extreme accuracy is required in positioning the second transparency along the optical path. It can be shown that the positioning of transparencies for a standard 35 millimeter aperture must be accurate to within about $10^{-5}$ meters (about 15 wavelengths of visible light). Such accuracy is extremely difficult to attain, particularly if the insertion of transparencies is to be done without the necessity for adjustments, and this is a major drawback to the more widespread use of such optical processing.

OBJECTS AND SUMMARY OF THE INVENTION

One object of the present invention is to provide an optical processing method and apparatus which is operated rapidly and with a minimum of adjustments.

Another object of the invention is to provide optical processing apparatus and methods for convoluting functions embodied in transparencies, wherein a minimum of accuracy in positioning the transparencies is required.

Yet another object of the invention is to provide apparatus for convolving two functions, each of which is represented by a transparency which contains light and dark areas proportioned to the values of the function it represents, which enables the positioning of the two transparencies in the same plane.

The foregoing and other objects are realized by apparatus for projecting a beam of coherent collimated light along a path in which are placed two transparencies containing the two functions to be convoluted. The transparencies are located in the same plane and are generally offset from the axis by the light beam by equal amounts but on opposite sides of the axis. The light emerging from the transparencies passes through a converging lens, and then falls on a first photographic film spaced from the lens a distance equal to the focal length of the lens. If the densities at each point of the first and second transparencies is $f(x,y)$ and $g(x,y)$ respectively, the densities at each point of the film after developing has components which contain the Fourier transforms $F(f_1 f_2)$ and $G(g_1 g_2)$ of the functions. Specifically, the density of the film is proportional to $$|G(f_1,f_2)e^{-j2y\pi_0 f_2}+F(f_1,f_2)e^{j2\pi y_1 f_2}|^2$$

where $G(f_1,f_2)$ and $F(f_1,f_2)$ are the Fourier transforms of $g(x,y)$ and $F(x,y)$, respectively $g(x,y)$ is offset from the optical axis in a positive direction by an amount equal to $Y_0$ and $f(x,y)$ is offset in the negative direction by an amount equal to $Y_1$.

The developed film containing the Fourier transform $$|G(f_1,f_2)e^{-j2\pi f_2 y_0}+F(f_1,f_2)e^{j2\pi f_2 y_1}|^2$$

is then placed in a holder, and a beam of coherent collimated light is projected through the film, through a converging lens, and onto a second photographic film. After developing, the density of the second film is proportional to the convolution of the two functions $f(x,y)$ and $g(x,y)$, which is $f(x,y)*g(x,y)$.

Unlike previous methods, this method places the two transparencies in the same plane, allows them to be transformed by the same lens, and allows both to be placed in the same collimated beam. As a result, slight inaccuracies in the apparatus generally have the same effect on both transparencies and do not prevent the obtaining of an accurate convolution. A slight shift of just one transparency from its optimum position will still allow an accurate convolution to be obtained.

BRIEF DESCRIPTION OF THE DRAWINGS

The novel features that are considered characteristic of this invention are set forth with particularity in the appended claims. The invention itself will best be understood from the following description when read in connection with the accompanying drawings.

DESCRIPTION OF THE PREFERRED EMBODIMENTS

Figure 1:
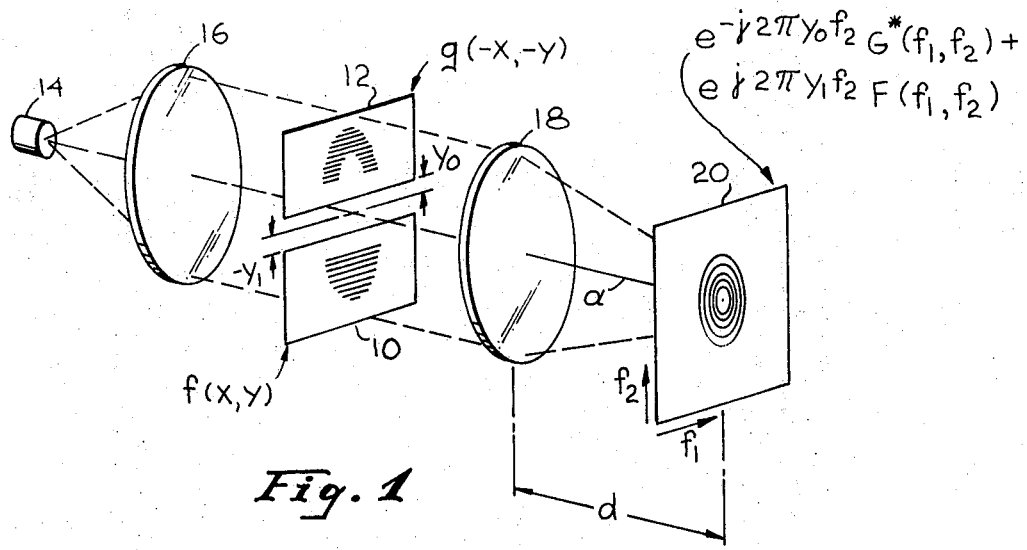
FIG. 1 is a functional diagram of an apparatus for obtaining a film record containing the Fourier transforms of two functions.
Figure 2:
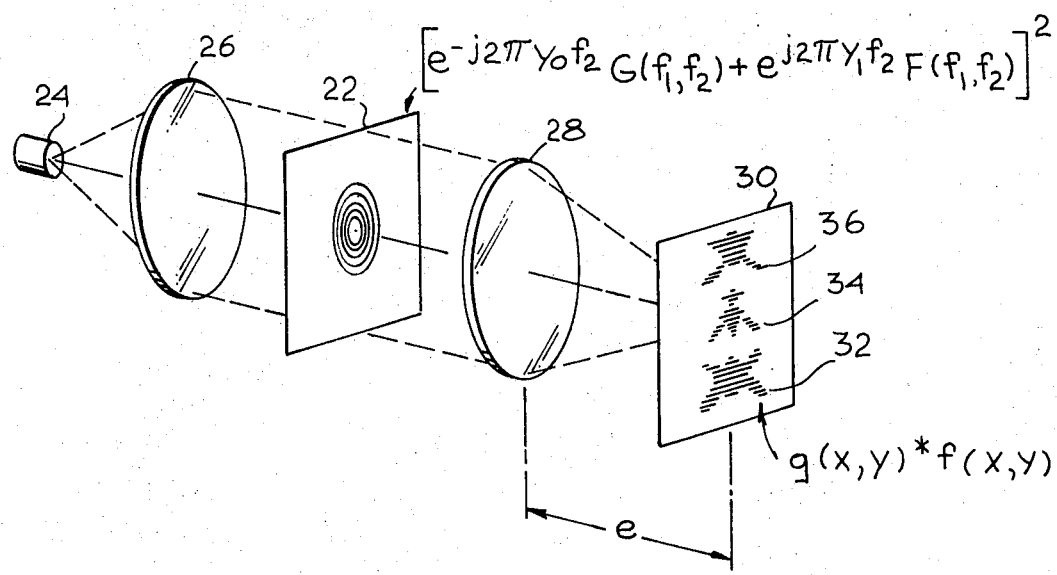
FIG. 2 is a functional diagram of apparatus for obtaining the convolution of the two original functions using the film record generated by the apparatus of FIG. 1.

FIGS. 1 and 2 illustrate two steps in a process for obtaining the convolution of two functions in accordance with the invention, and the apparatus for performing the process. The functions $f(x,y)$ and $g(x,y)$ are represented on transparencies 10 and 12, respectively shown in FIG. 1. The transparencies 10 and 12 are positive or negative film, and the functions $f(x,y)$ and $g(x,y)$ relate transmittance at a point on the film with its coordinates of position $x$ and $y$. The negative notations in $g(-x,-y)$ indicate the position of the $g(x,y)$ function relative to the $f(x,y)$ function. The transparencies are located in the path of a light beam obtained from a laser apparatus 14 and collimated by a lens 16 to obtain a monochromatic coherent light beam with parallel rays which is wide enough that it passes through the entire area of both transparencies 10 and 12. After passing through the transparencies, the beam passes through a convex lens 18 and falls on a sheet of photographic film 20 placed a distance $d$ from the lens 18 equal to its focal length. The image on the film 20 is a diffraction pattern. The film is of the positive type typically used to obtain photographic slides.

The film 20 is developed to obtain a transparency having diffraction patterns, and this transparency 22 is placed in the apparatus of FIG. 2 to obtain the convolutions of the functions $f(x,y)$ and $g(x,y)$. In the apparatus of FIG. 2, a laser apparatus 24 and collimating lens 26 provide a coherent collimated beam which passes through the transparency 22. The beam then passes through a convex lens 28 of focal length $e$ and onto a second film 30 located a distance $e$ from the lens 28. The portion 32 of the image incident on the second film 30 is the convolution of the two functions $f(x,y)$ and $g(x,y)$ which originally appeared on the transparencies 10 and 12.

A description of the relationship of the functions helps to understand the manner in which the convolution is obtained. In FIG. 1, the axis of the light beam is labeled $a$. The transparency 10 containing the function $g(x,y)$ is offset a distance $y_0$ from the axis $a$, while the transparency 12 containing the function $f(x,y)$ is offset by $-y_1$ from the axis $a$. Both transparencies are located in the same plane. The intensity I, of the image incident on the film 20 is given by $$I = G(f_1f_2)e^{-j2\pi y_0 f_2} + F(f_1f_2)e^{j2\pi y_1 f_1} \quad \text{(Eq. 1)}$$

where $e$ is the base of natural logarithms, $j$ is the square root of minus one, $y_0$ is the distance the transparency 12 is offset from the beam axis, $y_1$ is the distance the transparency 10 is offset from the beam axis, and $f_1$ and $f_2$ are the coordinates of points on the film 20, and $G(f_1f_2)$ and $F(f_1f_2)$ are the Fourier transforms of $g(x,y)$ and $f(x,y)$.

The transmittance of the film 20 is not necessarily proportional to the intensity of the exposing light. For a range of exposure values and developing, the transmittance is approximately proportional to the square of the intensity of incident light. In accordance with this invention, the film exposure and developing is adjusted to obtain a transmittance at each point which is proportional to the square of incident intensity. The transmittance of the developed film 22 is then given by $$[G^*(f_1f_2)e^{-j2\pi y_0 f_2} + F(f_1f_2)e^{j2\pi y_1 f_1}]^2$$
$$= G(f_1f_2)F(f_1f_2)e^{j2\pi(y_0+y_1)} + G^*(f_1f_2)F(f_1f_2)$$
$$e^{-2\pi j(y_0+y_1)} + [G(f_1f_2)]^2 + [F(f_1f_2)]^2 \quad \text{(Eq. 2)}$$

where the superscript * denotes the complex conjugate.

The apparatus of FIG. 2 projects the inverse of the transmittance of 22 onto the film 30. The inverse of the first term, $G(f_1f_2)F(f_1f_2)e^{j2\pi(y_0+y_1)}$ on the right side of Equation 2 is the convolution $g(x,y) * f(x,y)$ shifted by $-(y_0+y_1)$ on the film 30, and is the image portion 32 in the figure. This portion 32 provides the desired convolution of the functions which appeared on the transparencies 10 and 12.

It may be noted that the other image portions 34 and 36 represent the terms $[G(f_1f_2)]^2 + [F(f_1f_2)]^2$ and $G^*(f_1f_2)F(f_1f_2)e^{-2\pi j(y_0+y_1)}$ respectively. No attempt has been made to relate the images in the figures at 10, 12, 20, 22, and 30, to actual useful functions or to each other.

The distance between the bottom of the $g(x,y)$ transparency 12 and the top of the $f(x,y)$ transparency 10 (or the parts of the transparencies containing the functions) should be greater than max $(h_f h_g)$, where $h_f$ is the height of the $f(x,y)$ transparency and $h_g$ is the height of the $g(x,y)$ transparency. This spacing will prevent the transforms of $[G(f_1f_2)]^2 + [F(f_1f_2)]^2$ from overlapping $g(x,y) * f(x,y)$.

Figure 3:
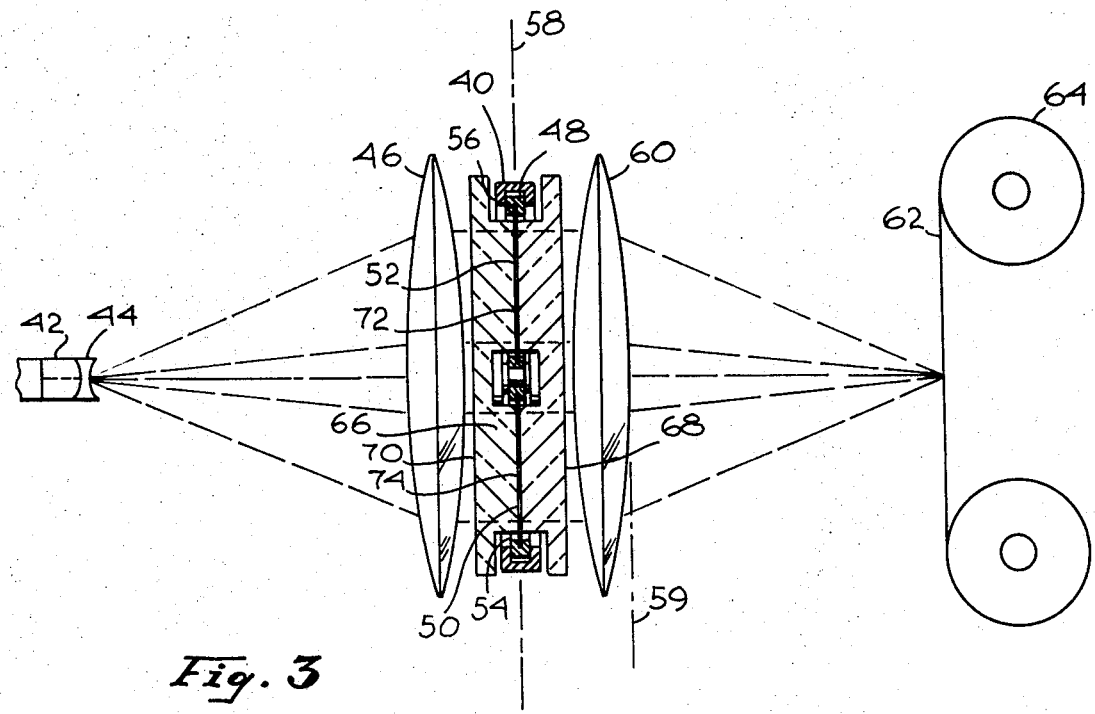
FIG. 3 is a side elevation representation of the apparatus of FIG. 1.

In the method described above, it is important to keep the two transparencies in the same plane or approximately the same plane. FIG. 3 illustrates a transparency holder 40 for accomplishing this, and shows its relationship to the other elements of that portion of the system shown in FIG. 1. The apparatus comprises a laser apparatus 42 for generating a monochromatic coherent light beam and concave lens 44 for diverging the beam. A convex lens 46 collimates the beam which shines on the holder 40.

The transparencies 50 and 52 commonly are single frames of 35 millimeter film held in cardboard mounts 54 and 56. Each mount can be inserted into a slot in the holder 40 and is held by grooves 48 so that both transparencies 50 and 52 lie in approximately the same plane, indicated at 58. In order to keep each transparency flat and more closely in the same plane, optical flats 66 and 68 are positioned on opposite sides of the transparencies. Optical flat 66, which is constructed of glass, has a first face 70 formed optically flat, and a pair of second faces 72 and 74 which are flat but not necessarily to the accuracy of the typical optical flat. The second faces 72 and 74 contact the transparencies 52 and 50 to hold them flat and coplanar. A film of oil is disposed on the faces 72 and 74 to prevent air spaces and the consequent reflections and distortions they can produce; the oil preferably has a refractive index between that of the glass of the optical flat and of the transparencies. The other optical flat 68 is of similar construction and is disposed on the other side of the transparencies in the same manner.

After the light beam passes through the transparencies 50 and 52 and the optical flats, it passes through a convex lens 60, and then to a film 62, which is a portion of a roll of positive film held in a magazine indicated at 64. The distance between the lens 60 and film 62 is equal to the focal length of the lens 60. Fraunhofer diffraction patterns of the functions on the transparencies appear on the film 62. The Fraunhofer diffraction patterns shining on the film are the sum of the Fourier transforms of the functions on the transparencies, but sufficient exposure and proper development (to obtain a square-law relationship of incident light to developed-film opacity or transparency) results in the obtaining of the product of the transforms, as previously described. After the diffraction patterns of the two transparencies 52 and 50 are exposed on the film 62, a new set of transparencies is inserted into the holder 40, the film 62 is advanced on the magazine, and a new exposure is made. When a roll of film is thus exposed, it is developed and the diffraction pattern transparencies are placed in slide frames.

The diffraction pattern transparencies may be illuminated in separate apparatus for the step illustrated in FIG. 2, or the same apparatus used in the first step and illustrated in FIGS. 1 or 3 may be used. A different transparency holder 40, or even the same one may be used, with the diffraction transparency in one slot and a blank transparency in the other, to occupy the space between the optical flats. The transparencies and film may be relatively light with opacity increasing with increase in value of the functions to be convoluted, or relatively opaque with transmittance that increases with increase in value of the function. It may also be noted that the transparencies of the original functions, e.g. 10 and 12 in FIG. 1, may be placed in the back focal plane of the converging lens 18, as shown, or in the front focal plane immediately adjacent to the lens, such as the plane 59 in FIG. 3.

The method and apparatus described above enables the obtaining of a convolution of $f(x,y)$ and $g(x,y)$ even if they are not located precisely in the same plane. If either transparency 10 or 12 is not located in the optimum location, this often being referred to as misregistered, by a small amount the true value of the convolution is shifted by that same amount in the back focal plane of the lens 28 and is not shifted at all relative to the easily located edge of the convolution. This may be compared to previous methods in which the two transparencies are spaced from each other along the axis of the laser beam, wherein a misregistration of more than a very small amount such as $10^{-5}$ meters for a standard 35 millimeter aperture, results in the true value of the convolution not being available anywhere in the back focal plane of the last lens. Also, the present method starts with transparencies directly representing the functions to be convoluted instead of requiring one of the original transparencies to be the Fourier transform of the function it represents as in previous methods.

As explained above, it is generally necessary to obtain a film record of the Fraunhofer diffraction pattern which is a square-law representation of the light incident on the film. In order to accomplish this, the intensity of light incident on the film over significant areas must be close to a value where the film records the square of intensity. In many cases, the intensity of the laser beam may be varied, as by filters. However, in cases where the laser beam is not bright enough, the system of FIG. 4 may be used.

Figure 4:
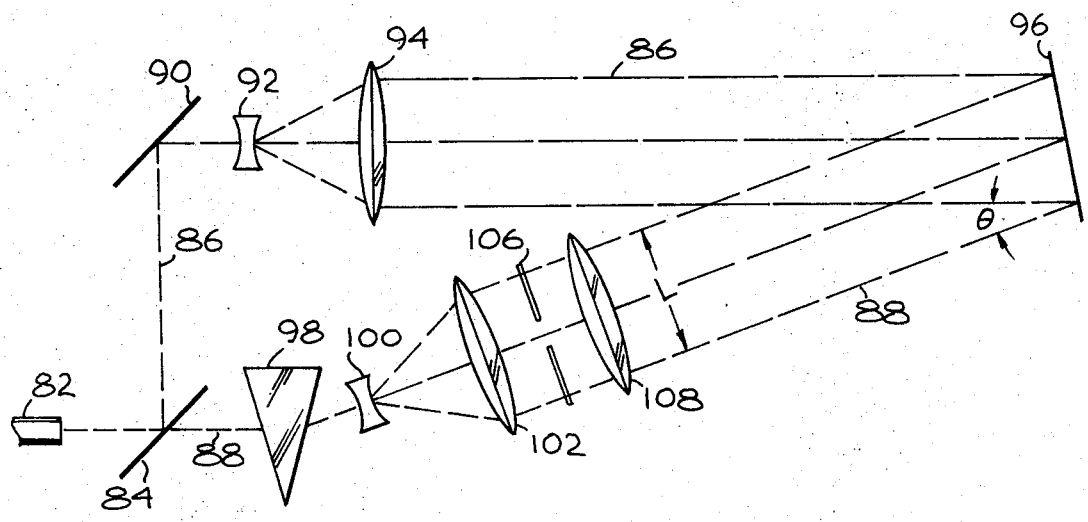
FIG. 4 is an alternative arrangement to that shown in FIG. 2 for convolving the two original functions.

In the system of FIG. 4, the beam from the laser 82 is divided by a beam splitter 84 to obtain a reference beam 86 and an information beam 88. The reference beam is reflected by mirror 90, dispersed by apparatus indicated by a concave lens 92, and collimated by a lens 94, and it shines on the film 96. The information beam 88 passes through a prism or wedge 98 and, as in the system shown in FIG. 1, is dispersed by apparatus indicated by the concave lens 100 and collimated by lens 102. The collimated beam passes through two transparencies 104 and 106 containing the functions to be convoluted, through a transforming lens 108, and onto the film 96.

The purpose of the reference beam 86 is to establish a "bias" point, or, in other words, to add a uniform intensity at every point, so that the intensity over most of the significant areas is a range which results in a square-law representation on the developed film.

The angle $\theta$ between the reference beam 86 and information beam 88 should be great enough to prevent the addition of more than a uniform brightness to the image falling on the film 96. For a final width L of the portion of the information beam which passes through the transparencies and a focal length of the transforming lens 108 equal to $f$, the angle $\theta$ in radians should be greater than $3/2 \times L/f$. Then, aside from a bright spot on the axis of the beams, the extra terms generated by the presence of the reference beam waves are deflected out of the region where the desired preliminary convolution appears. After the film 96 is exposed and developed, the final desired convolution may be obtained in the manner shown in FIG. 2.

Thus, the above described method and apparatus provides a novel means for optical processing by placing a first transparency and a second transparency with which it is to be convoluted in the same plane, transforming them with the same lens using the same reference beam, and using the "square law" effect of the photographic film to obtain the transform multiplication. Many variations and modifications in the particular method and apparatus described and illustrated can be resorted to, and the particular embodiments should be considered only as examples of the invention, not as limitations, as the scope of the invention is defined only by the following claims.

What is claimed is:

1. A method for cross correlating at least two functions represented in optical form comprising:

establishing optical representations of said at least two functions in a common plane;
   projecting a first beam of coherent light toward said optical representations;
   focusing light from said optical representations on an image plane to obtain a diffraction pattern including the Fourier transforms of said at least two functions;
   establishing a permanent optical image representing said diffraction pattern having a transmittance which is in accordance with the square of the intensity of light at each point of said image plane;
   projecting a second beam of collimated coherent light toward said permanent optical image; and
   focusing light from said permanent optical image onto an image receiving surface, whereby to obtain the convolution of said at least two functions.

2. A method for cross correlating as defined in claim 1 wherein:
   said optical representations are transparencies having transmittances and opacities of values in accordance with said functions, said step of establishing a permanent optical image comprises the exposing and developing of photographic film, and said permanent optical image is a photographic transparency.

3. A method for cross correlating as defined in claim 1 wherein:
   said step of establishing optical representations in a common plane comprises the holding of transparencies, each having light transmittance at each point thereon proportional to the functions to be convoluted, in the same plane whereby to enable the obtaining of convolutions of two functions using transparencies which are direct representations of the functions.

4. A method for cross correlating as defined in claim 1 wherein:
   said step of establishing optical representations in a common plane comprises the holding of transparencies, each having opacities at each point thereon proportional to the functions to be convoluted, in the same plane whereby to enable the obtaining of the convolution of two functions using transparencies which are direct representations of the functions.

5. A method for cross correlating as defined in claim 1 wherein:
   said step of establishing optical representations of said at least two functions comprises the positioning of two transparencies, each having a value of opacity and transparency at each point which is in a direct relationship to the function represented by the transparency, in the same plane and spaced laterally from each other;
   said projecting of a first beam comprises the generating of a monochromatic, coherent, collimated beam of light having a beam width which is greater than the width of said two transparencies in their common plane, and the directing of said beam through the areas of both said transparencies;
   said focusing of light from said optical representations comprises the positioning of a convex lens in the path of said beam at a position along the path of said beam which is at least as far from the source of said beam as a point immediately adjacent said plane of said transparencies and on the side of said plane closest to the source of said beam;
   said image plane is positioned a distance from said lens equal to the focal length of said lens; and
   said step of establishing a permanent optical image representing said diffraction pattern comprises the exposing of photosensitive transparency material held at said image plane for a period of time and developing it to provide a permanent transparency having a value of opacity and transparency at each point which is related to the intensity of the image at said image plane by a square law relationship.

6. A method for cross correlating as defined in claim 1 including:

the projection of a portion of said beam of coherent light along a path which bypasses said transparencies, and onto said image plane.

7. A method for cross correlating as defined in claim 1 including:

establishing at said image plane, a photographic film having a square law opacity to intensity of exposure relationship for certain intensities of exposure;

establishing an initial beam of coherent light;

splitting said initial beam into said first beam and a reference beam; and projecting said reference beam substantially uniformly onto said image plane, with an intensity which, when added to the intensity of said first beam on said image plane, provides an intensity of exposure approximately equal to said certain intensity for a significant portion of said diffraction pattern.

8. A method for cross correlating as defined in claim 7 wherein:

the angle, in radians, between said reference beam and said first beam is greater than one and one-half times the ratio of the width of the portion of the first beam which contains information from said optical representations to the distance along said first beam during which it is focused prior to shining on said image plane.

9. In the optical comparison of a function to be filtered or the like with a reference function by use of a collimated laser beam, the improvement comprising:

placing a transparency representing the function to be filtered laterally disposed and in the same plane as a transparency representing the reference function;

projecting the collimated laser beam through both of said transparencies simultaneously and thereafter through a converging lens means to create a diffraction pattern;

generating a transparency film record of said diffraction pattern which has a transparency characteristic proportional to the square of the brightness of said diffraction pattern; and projecting a collimated laser beam through said transparency film record, through a converging lens means, and onto an image plane.

References Cited

UNITED STATES PATENTS 3,319,518   5/1967   Carlson _____ 353—22

OTHER REFERENCES

Vander Lugt, "Signal Detection by Complex Spatial Filtering," IEEE Transactions on Information Theory, April 1964, pp. 139–145. (Spatial Filter digest).

Cutrona, "Optical Computing Techniques," IEEE Spectrum, vol. 1, No. 10, October 1964, pp. 101–108.

Weaver, et al., "A Technique for Optically Convolving Two Functions," Applied Optics, vol. 5, No. 7, July 1966, pp. 1248, 1249.

Stroke et al., "Resolution-Retrieving Compensation of Source Effects By Correlative Reconstruction In High-Resolution Holography," Physics Letters, vol. 18, No. 3, Sept. 1, 1965, pp. 274, 275.

JOHN K. CORBIN, Primary Examiner

U.S. Cl. X.R.

350—3.5; 356—71